United States Patent

Kuwabara et al.

[11] Patent Number: 5,997,079
[45] Date of Patent: Dec. 7, 1999

[54] HEAD LINING OF AUTOMOBILE

[75] Inventors: Akira Kuwabara; Takashi Mori, both of Kanagawa-ken, Japan

[73] Assignee: Ikeda Bussan Co., Ltd., Kanagawa-ken, Japan

[21] Appl. No.: 09/119,721

[22] Filed: Jul. 21, 1998

[30] Foreign Application Priority Data

Jul. 25, 1997 [JP] Japan .................... 9-200402

[51] Int. Cl.$^6$ ...................................................... B60J 7/00
[52] U.S. Cl. ........................................................ 296/214
[58] Field of Search ............................ 296/214, 39.1

[56] References Cited

U.S. PATENT DOCUMENTS

| | | | |
|---|---|---|---|
| 4,131,702 | 12/1978 | Alfter et al. | 296/214 X |
| 4,172,918 | 10/1979 | Doerer | 296/214 X |
| 4,352,522 | 10/1982 | Miller | 296/214 |
| 4,840,832 | 6/1989 | Weinle et al. | 296/214 X |
| 4,902,068 | 2/1990 | Dowd et al. | 296/214 |
| 4,958,878 | 9/1990 | Kempkers | 296/214 X |
| 5,833,304 | 11/1998 | Daniel et al. | 296/214 |

FOREIGN PATENT DOCUMENTS 3067117  3/1988  Japan .................... 296/214

*Primary Examiner*—D. Glenn Dayoan
*Assistant Examiner*—Lori L. Coletta
*Attorney, Agent, or Firm*—Nath & Associates; Gary M. Nath; Harold L. Novick

[57] ABSTRACT

A head lining of an automobile is formed with a notched portion which is surrounded by a forward corresponding portion of the head lining to be brought into contact with a front surface of a pillar, and a backward corresponding portion of the head lining to be brought into contact with a rear surface of the pillar. The head lining is further formed with first slits on the head lining so that the forward corresponding portion and backward corresponding portion are brought into contact with the front surface and rear surface of the pillar in such a manner that the forward corresponding portion and backward corresponding portion are curved downwardly. The forward corresponding portion and backward corresponding portion are formed so as to be extended from a position where they are brought into contact with the front surface and rear surface of the pillar.

4 Claims, 3 Drawing Sheets

HEAD LINING OF AUTOMOBILE

BACKGROUND OF THE INVENTION

1. Field of the Invention

The present invention relates to a head lining of an automobile.

2. Description of the Related Arts

A head lining is provided to a lower surface of a roof panel of an automobile, and notched portions are formed in a portion corresponding to a pillar of a car body on the end portion of the head lining in a vehicle-width direction. The notched portions are formed so as to avoid interference with the pillar, and a prescribed gap is secured between the pillar, corresponding forward and backward portions of the notched portions, and between the pillar and a corresponding inner portion of the notched portion.

However, in such a conventional technique, since the gap is secured between the notched portion and pillar, a position of the head lining with respect to the pillar is not stabilized. The head lining causes not only displacement in the forward-and-backward direction and vehicle-width direction but also displacement in an up-and-down direction. Namely, since an upper end of the pillar is connected with the roof, its cross sectional form is enlarged, and a front and rear surfaces and inner surface of the pillar are slanted. For this reason, the aforementioned gap can raise the head lining up to a position where the corresponding portions of the notched portions are brought into contact with the slanted front and rear surfaces and inner surface, and thus the up-and-down position is not stabilized.

SUMMARY OF THE INVENTION

The present invention is devised by and from a viewpoint of such a conventional technique, and it is an object of the present invention to provide a head lining of an automobile whose position with respect to a pillar is stable.

To achieve the object, according to a first aspect of the present invention, there is provided a head lining of an automobile, comprising: a notched portion formed on a portion corresponding to a pillar of a body of the automobile, the notched portion being surrounded by a forward corresponding portion of the head lining to be brought into contact with a front surface of the pillar, and a backward corresponding portion of the head lining to be brought into contact with a rear surface of the pillar; and first slits formed on the head lining so that the forward corresponding portion and backward corresponding portion are brought into contact with the front surface and rear surface of the pillar in such a manner that the forward corresponding portion and backward corresponding portion are curved downwardly, wherein the head lining is made of a material which can be elastically deformed; and the forward corresponding portion and backward corresponding portion are formed so as to be extended from a position where they are brought into contact with the front surface and rear surface of the pillar.

According to the above arrangement, since the forward corresponding portion and backward corresponding portion of the notched portion, which are freely deflected due to the first slits, are brought into contact with the front surface and rear surface of the pillar, a position of the head lining in a forward-and-backward direction is stabilized. Moreover, in the case where an upper end of the pillar is enlarged and the front surface and rear surface are slanted, the forward corresponding portion and backward corresponding portion, which are deflected and brought into contact with the front and rear surfaces, does not lift along the slanted front and rear surfaces, so a position of the head lining in the up-and-down direction is also stabilized.

A second aspect of the present invention provides a head lining of an automobile, comprising: a notched portion formed on a portion corresponding to a pillar of a body of the automobile, the notched portion facing to an inner corresponding portion of the head lining to be brought into contact with an inner surface of the pillar in the vehicle-width direction; and second slits formed on the head lining so that the inner corresponding portion is brought into contact with the inner surface of the pillar in such a manner that the inner corresponding portion is curved, wherein the head lining is made of a material which can be elastically deformed; and the inner corresponding portion is formed so as to be extended from a position where it is brought into contact with the inner surface of the pillar.

According to the above arrangement, since the inner corresponding portion of the notched portions, which is deflected freely due to the second slits, is brought into contact with the inner surface of the pillar, a position of the head lining in the vehicle-width direction is stabilized. Moreover, in the case where an upper end of the pillar is enlarged and the inner surface is slanted, the inner corresponding portion, which is deflected and brought into contact with the inner surface, does not lift along the slanted inner surface, so a position of the head lining in the up-and-down direction is stabilized.

A third aspect of the present invention provides a head lining of an automobile, comprising: a notched portion formed on a portion corresponding to a pillar of a body of the automobile, the notched portion being surrounded by a forward corresponding portion of the head lining to be brought into contact with a front surface of the pillar, a backward corresponding portion of the head lining to be brought into contact with a rear surface of the pillar, and an inner corresponding portion of the head lining to be brought into contact with an inner surface of the pillar in a vehicle-width direction; first slits formed on the head lining so that the forward corresponding portion and backward corresponding portion are respectively brought into contact with the front surface and rear surface of the pillar in such a manner that the forward corresponding portion and backward corresponding portion are curved downwardly; and second slits formed on the head lining so that the inner corresponding portion is brought into contact with the inner surface of the pillar in such a manner that the inner corresponding portion is curved, wherein the head lining is made of a material which can be deformed elastically; the forward corresponding portion and backward corresponding portion are formed so as to be extended from a position where they are brought into contact respectively with the front and rear surfaces of the pillar; and the inner corresponding portion is formed so as to be extended from a position where it is brought into contact with the inner surface of the pillar.

According to the above arrangement, since both the first and second slits are formed, a position of the head lining in the forward-and-backward direction and vehicle-width direction is stabilized. Moreover, in the case where an upper end of the pillar is enlarged, a position of the head lining in the up-and-down direction is also stabilized.

According to a fourth aspect of the present invention as it depends from the third aspect, the first slits and second slits are slanted in such a manner that the first slits and second slits are extended slantingly from the corner portion between the forward corresponding portion and inner corresponding portion, and from the corner portion between the backward corresponding portion and inner corresponding portion respectively, thereby the slanted slits serve as the first slits and second slits.

According to the above arrangement, only by forming the slanted slits which also serve as the first and second slits, the position of the head lining in the forward-and-backward direction and vehicle-width direction is stabilized.

BRIEF DESCRIPTION OF THE ACCOMPANYING DRAWINGS

The above and further objects and novel features of the present invention will more fully appear from the following detailed description when the same is read in conjunction with the accompanying drawings, in which.

DETAILED DESCRIPTION OF THE PREFERRED EMBODIMENTS

Figure 1:
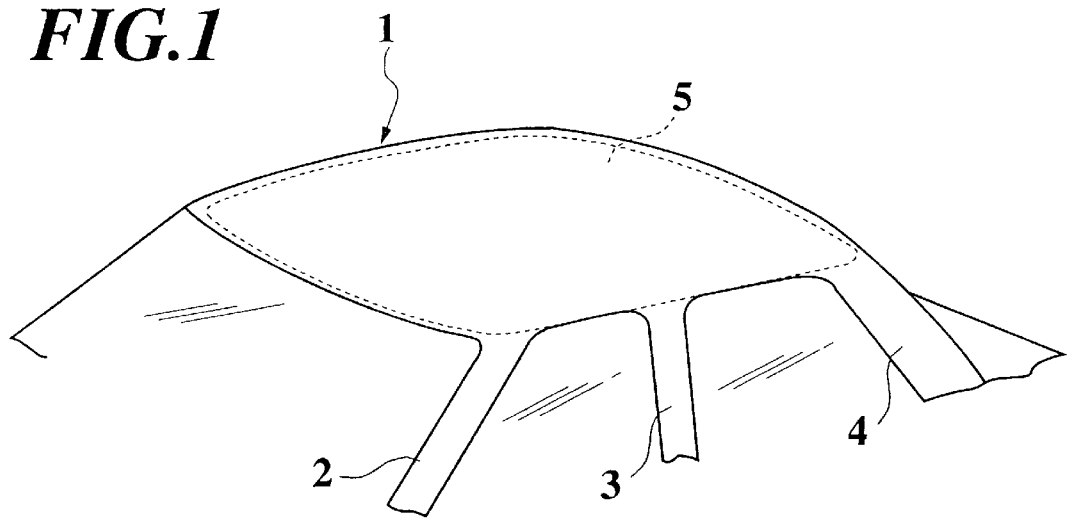
FIG. 1 is a perspective view showing an automobile roof panel according to first embodiment of the present invention.
Figure 2:
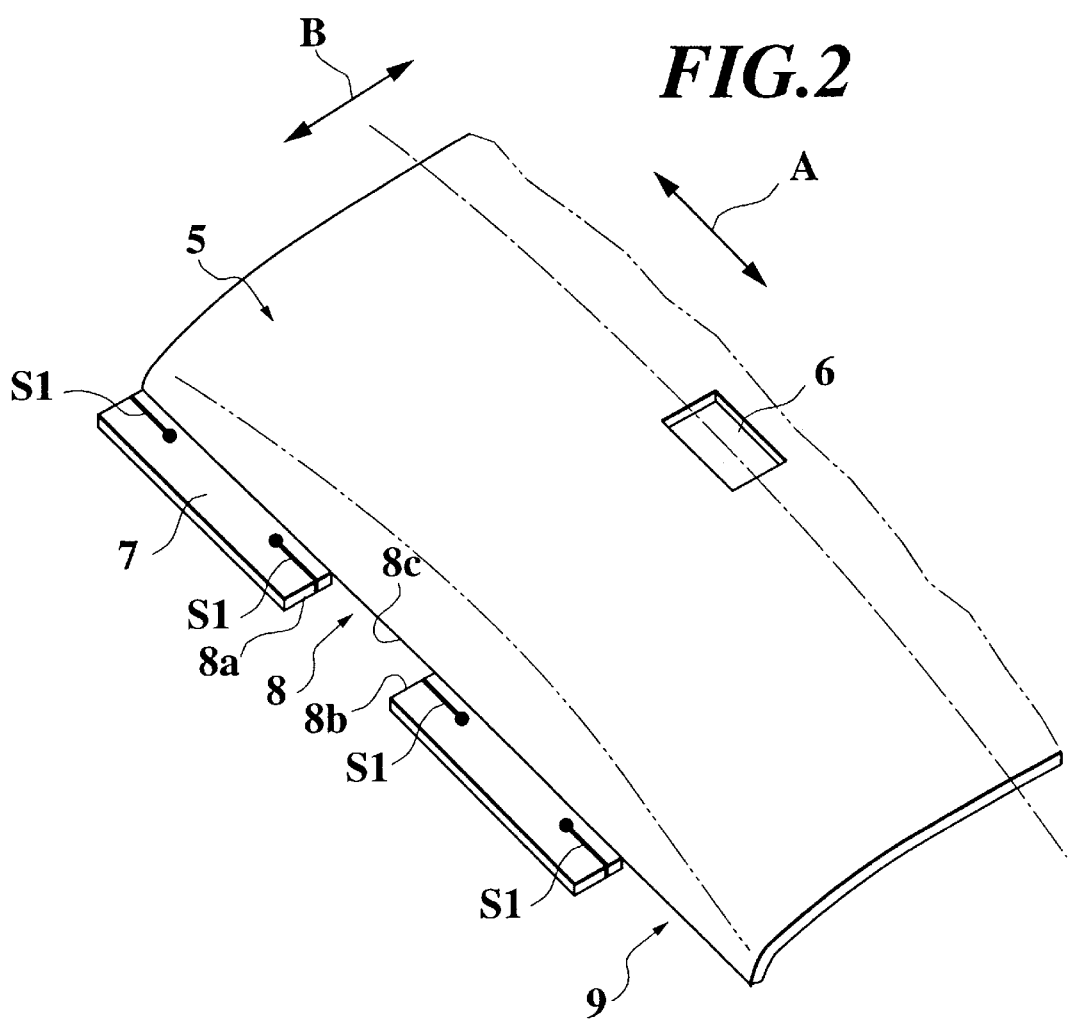
FIG. 2 is a perspective view showing an about left-half portion of the head lining.

There will be detailed below the preferred embodiments of the present invention with reference to the accompanying drawings. Like members are designated by like reference characters.

FIGS. 1 through 4 are drawings showing the first embodiment of the present invention. Here, in FIG. 2, A is a forward-and-backward direction (the left in the drawing is the forward side) and B is a vehicle-width direction.

1 is a roof panel of an automobile, and the roof panel 1 is connected with a front pillar 2, center pillar 3 and rear pillar 4. A head lining 5 is provided to a lower side of the roof panel 1. The head lining 5 is formed so that a front skin sheet is laminated on a porosity polypropylene layer, and it has a characteristic such that it can be elastically deformed.

An opening 6 for attaching a loop lamp is formed on a center portion of the head lining 5. An end 7 of the head lining 5 in the vehicle-width direction is gently curved towards down and is horizontal. Then, notched portions 8 and 9 are formed respectively on portions corresponding to the center pillar 3 and rear pillar 4 at the end 7 of the head lining 5. A first slit S1 which is along the forward-and-downward direction is formed forward and backward of the notched portion 8 in the center pillar 3, and a forward side of the notched portion 9 in the rear pillar 4, and on the front end of the end 7 in the front pillar 2.

Figure 4:
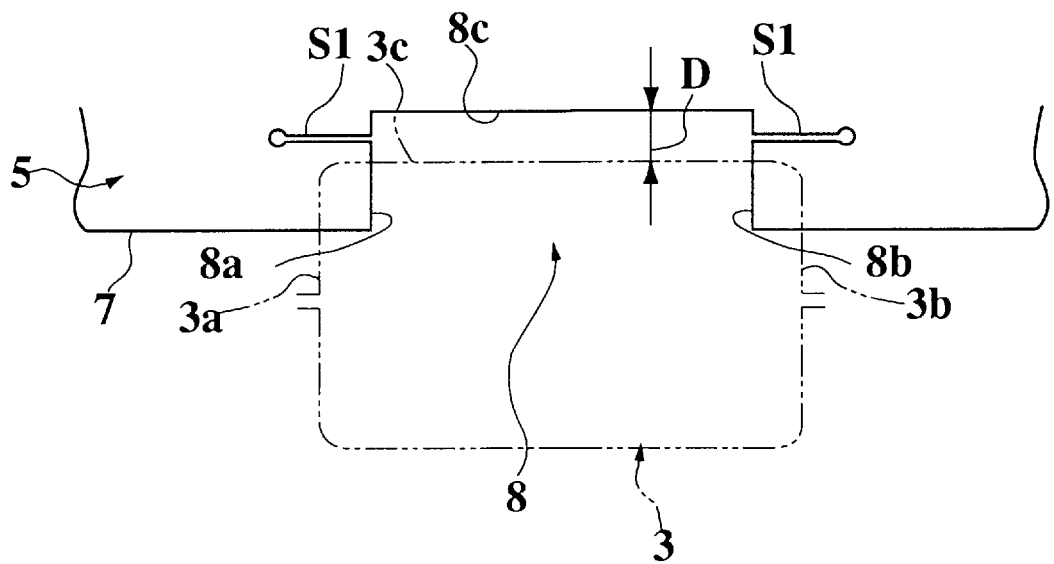
FIG. 4 is a plane view showing a notched portion of the center pillar.

Next, a construction of the notched portion 8 in the center pillar 3 is explained based on FIG. 4. A forward-and-backward width of the notched portion 8 is narrower than a forward-and-backward width of the center pillar 3, and a forward corresponding portion 8a and backward corresponding portion 8b of the notched portion 8 are extended from the position where a front surface 3a of the center pillar 3 is brought into contact with a rear surface 3b. Here, an inner corresponding portion 8c of the notched portion 8 is not extended towards the center pillar 3, and a prescribed gap D is secured between the inner corresponding portion 8c and an inner surface 3c of the center pillar 3.

The first slit S1 is formed in a position, which is more inner than the center pillar 3, on the forward corresponding portion 8a and backward corresponding portion 8b of the notched portion 8. The first slits S1 are formed along the forward-and-backward direction from the notched portion 8, and they are extended up to positions which exceed the front surface 3a and rear surface 3b of the center pillar 3.

Since the first slits S1 are formed in such a manner, the forward corresponding portion 8a and backward corresponding portion 8b of the notched portion 8 are deflected freely. For this reason, when the head lining 5 is mounted, the forward corresponding portion 8a and backward corresponding portion 8b which are deflected are brought into contact with the front surface 3a and rear surface 3b of the center pillar 3 respectively (see FIG. 3). Therefore, a position of the head lining 5 in the forward-and-backward direction is stabilized.

Figure 3:
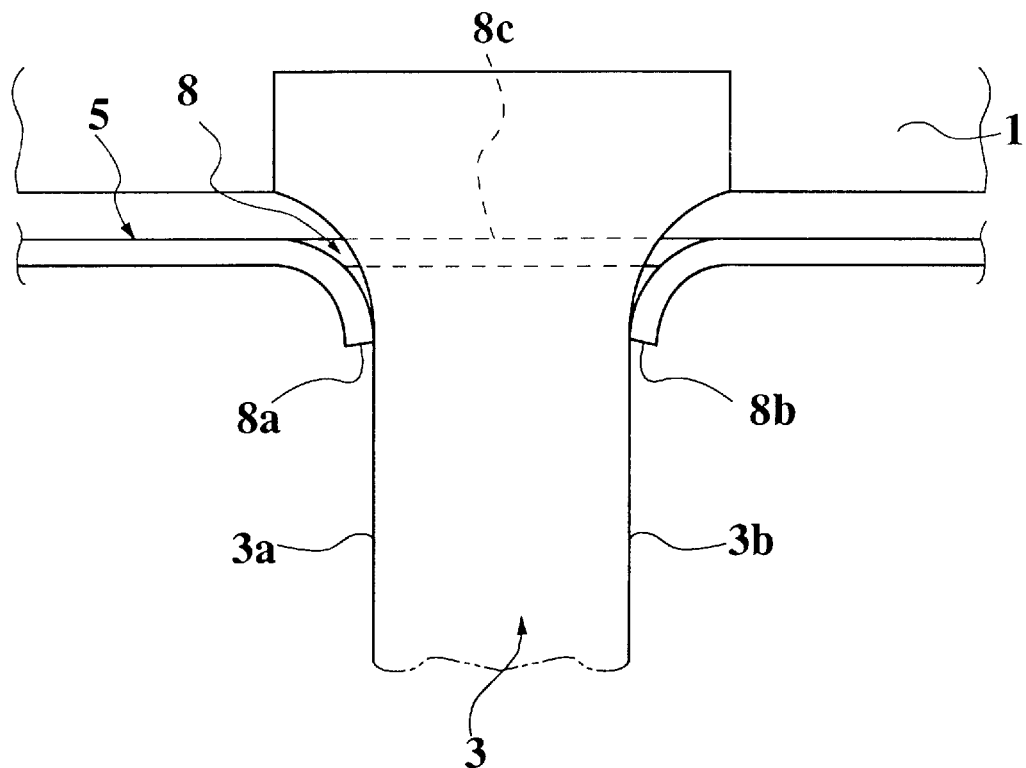
FIG. 3 is a side view showing a vicinity of an upper end of a center pillar.

In addition, as shown in FIG. 3, in the case where an upper end of the center pillar 3 is enlarged, and the front surface 3a and rear surface 3b are slanted, the forward corresponding portion 8a and backward corresponding portion 8b, which are deflected and brought into contact with the front surface 3a and rear surface 3b, does not lift along the slanted front surface 3a and rear surface 3b. For this reason, a position of the head lining 5 in the up-and-down direction is also stabilized.

Since the first slit S1 is formed also on portions corresponding to the front pillar 2 and rear pillar 4, also on the front pillar 2 and rear pillar 4, the position of the head lining 5 in the forward-and-backward direction and up-and-down direction is stabilized.

Figure 5:
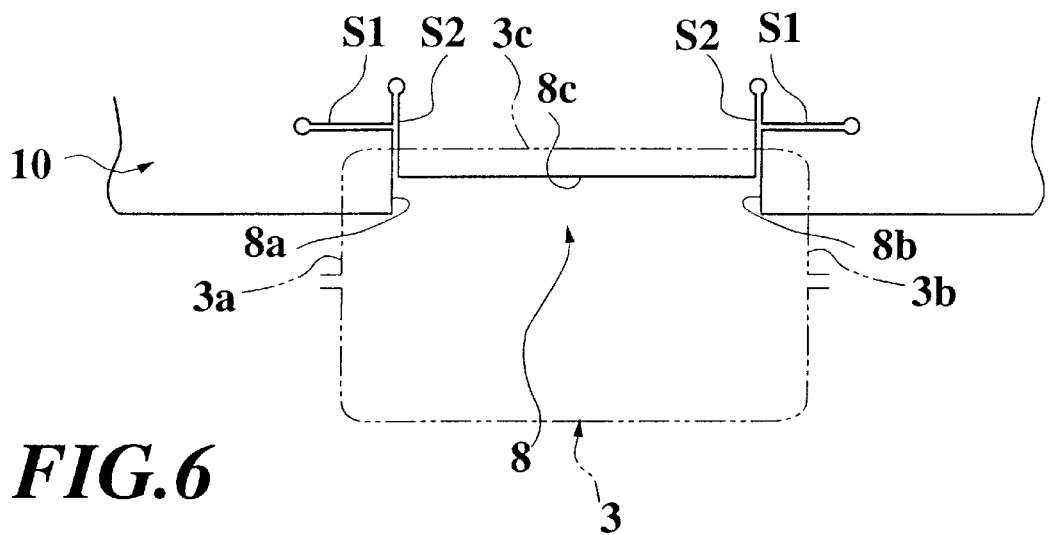
FIG. 5 is a plane view showing the notched portion according to second embodiment of the present invention.

FIG. 5 is a drawing showing the second embodiment of the present invention. In a head lining 10 of the second embodiment, not only the forward corresponding portion 8a and rear corresponding portion 8b of the notched portion 8 but also the inner corresponding portion 8c are extended from the position where the inner corresponding portion 8c is brought into contact with the inner surface 3c of the center pillar 3. A second slit S2 is formed in both end positions of the inner corresponding portion 8c. The second slits S2 are formed along the vehicle-width direction from the notched portion 8, and they exceeds the inner surface 3c of the center pillar 3. Further, the first slits S1, which are along the forward-and-backward direction, are formed so as to be extended from the second slits S2.

Therefore, the inner corresponding portion 8c of the notched portion 8 is brought into contact with the inner surface 3c of the center pillar 3 with the inner corresponding portion 8c being deflected, and the forward corresponding portion 8a and backward corresponding portion 8b are brought into contact with the front surface 3c and rear surface 3b of the center pillar 3 with them being deflected. For this reason, the position of the head lining 10 in the forward-and-backward direction and vehicle-width direction is stabilized. Moreover, since the upper end of the center pillar 3 is enlarged, the position of the head lining 10 in the up-and-down direction is also stabilized. Here, the front pillar and rear pillar respectively have the similar arrangement.

Figure 6:
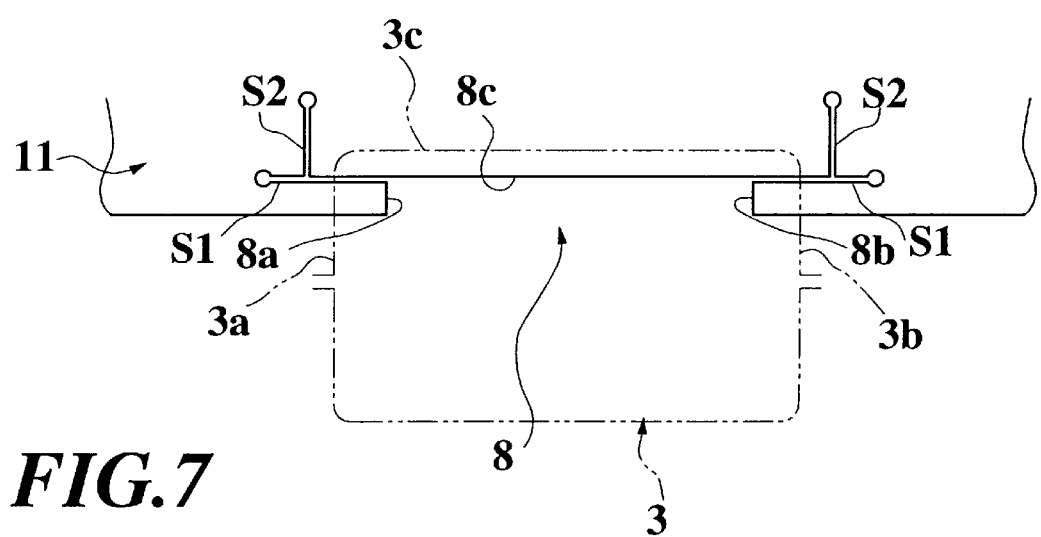
FIG. 6 is a plane view showing the notched portion according to third embodiment of the present invention.

FIG. 6 is a drawing showing the third embodiment of the present invention. In a head lining 11 of the third embodiment, the first slits S1, which are along the forward-and-backward direction, are formed respectively on both the ends of the inner corresponding portion 8c of the notched portion 8, and the second slits S2, which are along the vehicle-width direction, are formed respectively so as to be extended from the first slits S1. Also in such a manner, the equivalent effect to the second embodiment can be obtained.

Figure 7:
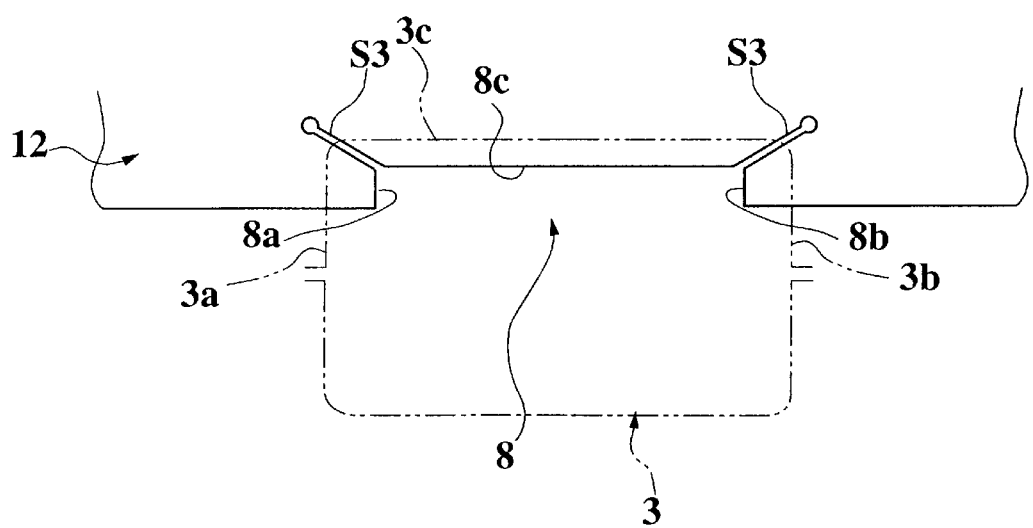
FIG. 7 is a plane view showing the notched portion according to fourth embodiment of the present invention.

FIG. 7 is a drawing showing the fourth embodiment of the present invention. In a head lining 12 of the fourth embodiment, slanted slits S3 are formed so as to be extended from an angle portion of the forward corresponding portion 8a and the inner corresponding portion 8c of the notched portion 8 and an angle portion of the backward corresponding portion 8b and the inner corresponding portion 8c of the notched portion 8. The slanted slits S3 also serve as the aforementioned first slits and second slits, and only by forming the slanted slits S3, the equivalent effect to the second and third embodiments can be obtained.

The above description refers to the example (first embodiment) in which the forward corresponding portion 8a and backward corresponding portion 8b of the notched portion 8 are extended and formed, and the examples (second through fourth embodiments) in which the forward corresponding portion 8a and backward corresponding portion 8b and inner corresponding portion 8c are extended and formed. However, only the inner corresponding portion 8c may be extended and formed, and only the second slits S2 may be formed. In this case, the position of the head lining in the vehicle-width direction is stabilized.

While preferred embodiments of the present invention have been described using specific terms, such description is for illustrative purposes, and it is to be understood that changes and variations may be made without departing from the spirit or scope of the following claims.

What is claimed is:

1. A head lining of an automobile, comprising:

a notched portion formed on a portion corresponding to a pillar of a body of the automobile, the notched portion being surrounded by a forward corresponding portion of the head lining to be brought into contact with a front surface of the pillar, and a backward corresponding portion of the head lining to be brought into contact with a rear surface of the pillar; and first slits formed on the head lining so that the forward corresponding portion and backward corresponding portion are brought into contact with the front surface and rear surface of the pillar in such a manner that the forward corresponding portion and backward corresponding portion are curved, wherein the head lining is made of a material which can be elastically deformed; and the forward corresponding portion and backward corresponding portion are formed so as to be extended from a position where they are brought into contact with the front surface and rear surface of the pillar.

2. A head lining of an automobile, comprising:

a notched portion formed on a portion corresponding to a pillar of a body of the automobile, the notched portion facing to an inner corresponding portion of the head lining to be brought into contact with an inner surface of the pillar in the vehicle-width direction; and second slits formed on the head lining so that the inner corresponding portion is brought into contact with the inner surface of the pillar in such a manner that the inner corresponding portion is curved, wherein the head lining is made of a material which can be elastically deformed; and the inner corresponding portion is formed so as to be extended from a position where it is brought into contact with the inner surface of the pillar.

3. A head lining of an automobile, comprising:

a notched portion formed on a portion corresponding to a pillar of a body of the automobile, the notched portion being surrounded by a forward corresponding portion of the head lining to be brought into contact with a front surface of the pillar, a backward corresponding portion of the head lining to be brought into contact with a rear surface of the pillar, and an inner corresponding portion of the head lining to be brought into contact with an inner surface of the pillar in a vehicle-width direction;

first slits formed on the head lining so that the forward corresponding portion and backward corresponding portion are respectively brought into contact with the front surface and rear surface of the pillar in such a manner that the forward corresponding portion and backward corresponding portion are curved; and second slits formed on the head lining so that the inner corresponding portion is brought into contact with the inner surface of the pillar in such a manner that the inner corresponding portion is curved, wherein the head lining is made of a material which can be deformed elastically;

the forward corresponding portion and backward corresponding portion are formed so as to be extended from a position where they are brought into contact respectively with the front and rear surfaces of the pillar; and the inner corresponding portion is formed so as to be extended from a position where it is brought into contact with the inner surface of the pillar.

4. The head lining of an automobile according to claim 3, wherein the first slits and second slits are slanted in such a manner that the first slits and second slits are extended slantingly from the corner portion between the forward corresponding portion and inner corresponding portion, and from the corner portion between the backward corresponding portion and inner corresponding portion respectively, thereby the slanted slits serve as the first slits and second slits.

* * * * *